United States Patent [19]

Klink

[11] Patent Number: 5,622,338

[45] Date of Patent: Apr. 22, 1997

[54] TRUCK HUNTING DETECTION AND ABATEMENT APPARATUS USING SELECTIVE BRAKE APPLICATION

[75] Inventor: Douglas D. Klink, Weatherby Lake, Mo.

[73] Assignee: Technical Services and Marketing Inc., Kansas City, Mo.

[21] Appl. No.: 674,503

[22] Filed: Jul. 2, 1996

[51] Int. Cl.⁶ .................................................. B61L 23/00
[52] U.S. Cl. ............................... 246/169 R; 246/182 B; 105/157.1; 105/168; 303/20
[58] Field of Search .......................... 105/157.1, 165, 105/167, 168, 171, 182.1; 246/182 R, 182 B, 182 C, 167 R, 168.1, 169 R; 303/20, 146

[56] References Cited

U.S. PATENT DOCUMENTS

| | | | |
|---|---|---|---|
| 3,961,584 | 6/1976 | Paton et al. | 105/224 |
| 4,393,957 | 7/1983 | Hawthorne | 105/157.1 |
| 5,237,604 | 8/1993 | Ryan . | |
| 5,275,475 | 1/1994 | Hartmann et al. | 303/103 |
| 5,335,974 | 8/1994 | Klink . | |
| 5,393,129 | 2/1995 | Troiani et al. . | |
| 5,478,143 | 12/1995 | Doden et al. | 303/150 |
| 5,492,067 | 2/1996 | Anderson | 105/163.2 |
| 5,507,234 | 4/1996 | Thorsen | 105/163.2 |

Primary Examiner—S. Joseph Morano
Attorney, Agent, or Firm—Hovey, Williams, Timmons & Collins

[57] ABSTRACT

A brake control apparatus (8) for a rail car including a truck (14) traveling along a rail (16, 18) includes a truck hunting detection and abatement apparatus (10) for use as part of a brake controller (12). The brake controller (12) is configured for braking the rail car. The apparatus (10) includes a sensor (26) for measuring acceleration of the rail car in a direction transverse to the rail (16, 18), and a control device (24) of the brake controller (12). The control device (24) includes a microprocessor (30) and is responsive to the sensor (26) for comparing the measured acceleration of the rail car with a predetermined acceleration limit. The control device (24) is configured to apply the brakes when the measured acceleration exceeds the predetermined acceleration limit. The control device (24) also determines the time interval between successive brake applications, and generates a message for transmission to a train locomotive moving the rail car when the measured time interval is less than a predetermined time interval limit, alerting the locomotive engineers of excessive truck hunting.

18 Claims, 2 Drawing Sheets

5,622,338

TRUCK HUNTING DETECTION AND ABATEMENT APPARATUS USING SELECTIVE BRAKE APPLICATION

BACKGROUND OF THE INVENTION

1. Field of the Invention

The present invention relates to a braking system of a rail car having a truck traveling on a rail. More particularly, the present invention relates to an apparatus for detection and abatement of excessive oscillatory movement of the truck with respect to the rail.

2. Description of the Prior Art

Truck hunting is a condition in which the wheel set or truck of a rail car begins to oscillate from side to side between the rails of the track while being moved along the track by a train locomotive. The oscillation may be caused by uneven Wear of truck components, defects in the track or a variety of other problems. The oscillation results in rapid wear of the truck components and the track. In addition, truck hunting may result in damage to cargo carried by the rail car, as well as instability during operation which may lead to derailment.

In response to this problem, locomotive engineers apply the brakes of the train upon feeling the side-to-side, oscillatory movement. By applying the brakes, the period of the oscillation is changed, causing the truck hunting to subside.

Detection of truck hunting, however, is relatively difficult, especially on freight trains where the locomotive engineers may be a great distance from a rail car experiencing truck hunting. As a result, a truck hunting condition may go undetected for long periods of time, leading to the above-mentioned damage and instability.

In addition, the engineer must manually apply the brakes upon feeling the truck hunting condition. Such application of the brakes by an engineer often results in over-braking which leads to reduced efficiency and increased wear on brake components.

SUMMARY OF THE INVENTION

The truck hunting detection and abatement apparatus of the present invention addresses the prior art problems discussed above, and provides a distinct advance in the state of the art. More particularly, the apparatus hereof is configured to detect the movement of a truck of a rail car in a direction transverse to the track, and to cause application of the brakes of the rail car for abating the truck hunting condition.

A truck hunting detection and abatement apparatus is adapted for use in a brake control apparatus of a rail car traveling along a rail. The rail car includes a truck or wheel set and is moved along the track by a train locomotive.

In broad terms, the truck hunting detection and abatement apparatus comprises a sensor means for measuring acceleration of the rail car in a direction transverse to the rail, and control means of a brake controller of the rail car. The control means is responsive to the sensor means for comparing the measured acceleration of the rail car with a predetermined acceleration limit.

The control means is configured to monitor the acceleration of the rail car truck for determining whether the measured acceleration exceeds the predetermined acceleration limit. This situation is representative of the truck hunting condition. Upon detection of the truck hunting condition, the control means applies the brakes of the rail car, abating the condition. Once the truck hunting condition has been sufficiently abated, the measured acceleration falls below the predetermined limit.

The control means may also include a measuring means for measuring the time interval between successive brake applications, and a means for comparing the time interval with a predetermined time interval limit. Excessive occurrences of the truck hunting condition are represented by the measured time interval being less than the predetermined time interval limit. A message is generated by the control means in such an instance for transmission to a head end unit of the train locomotive moving the rail car. The message alerts the locomotive engineers that the truck hunting condition is occurring excessively. As a result, the engineers may have service personnel investigate the suspect truck and make any necessary adjustments or repairs.

DESCRIPTION OF THE DRAWING FIGURES

A preferred embodiment of the present invention is described in detail below with reference to the attached drawing figures, wherein:

FIG. 1 is a schematic illustration of a preferred truck hunting detection and abatement apparatus; and FIG. 2 is a flow diagram illustrating the operation of the apparatus of FIG. 1.

DETAILED DESCRIPTION OF THE PREFERRED EMBODIMENT

Figure 1:
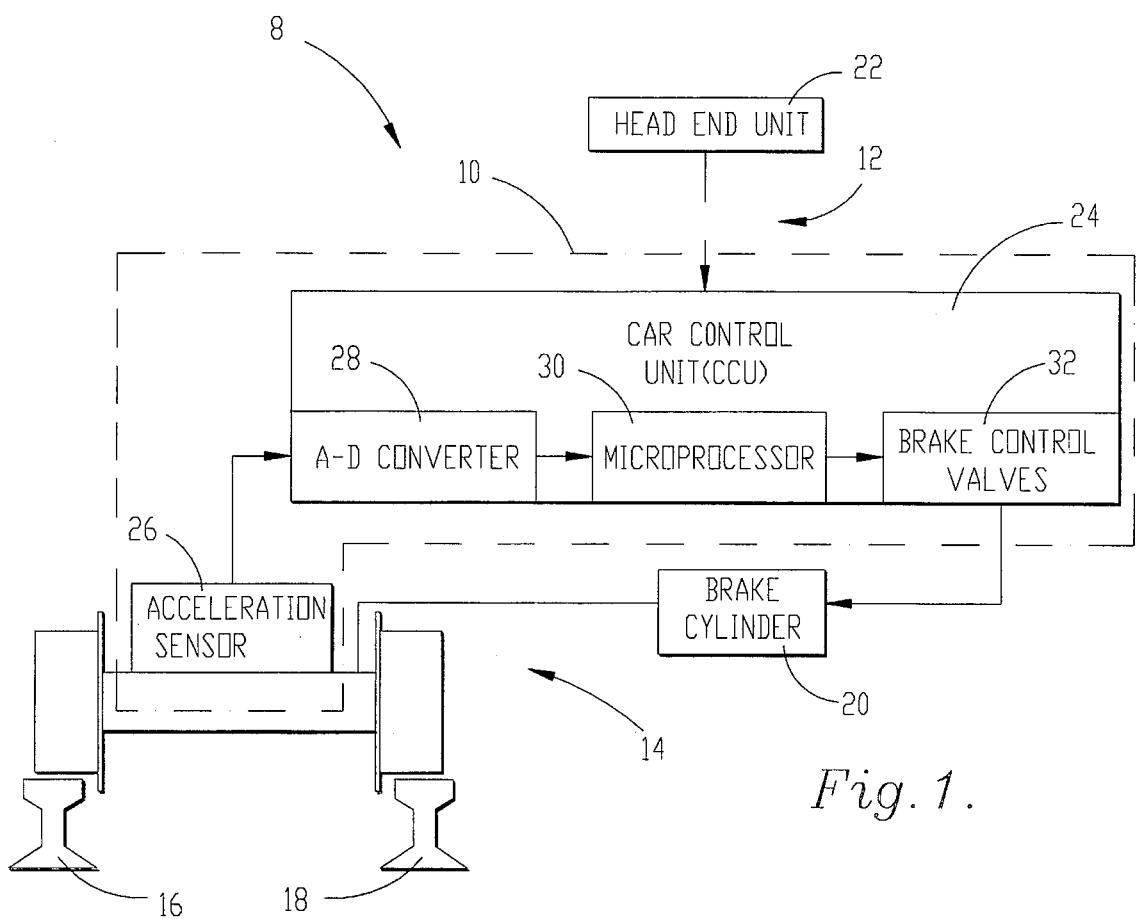

Rail car brake control apparatus 8 constructed in accordance with a preferred embodiment of the present invention is illustrated in FIG. 1. Brake control apparatus 8 broadly includes truck hunting detection and abatement apparatus 10 adapted for use in brake controller 12 of a rail car traveling along a track. The rail car includes truck 14 and is moved along the track by a train locomotive. Apparatus 10 is configured to detect a truck hunting condition of the rail car where truck 14 is engaged in side-to-side, oscillatory movement between rails 16, 18 of the track, and abate the truck hunting condition by causing brake controller 12 to apply the brakes of the rail car.

Brake controller 12 is configured for controlling the brakes of the rail car, and is preferably an electronic brake system controller such as the controller manufactured by Technical Service and Marketing, Inc., 10765 Ambassador Drive, Kansas City, Mo. 64153, and sold under model no. P.N. 081-50101. Controller 12 is described more fully in U.S. Pat. No. 5,335,974 and U.S. patent application Ser. No. 08/559,630, incorporated by reference.

Brake controller 12 controls the brakes of the rail car by controlling the amount of air delivered to pneumatically operated brake cylinder 20 of the rail car. Controller 12 generally includes head end unit 22 and at least one car control unit 24.

Head end unit 22 is positioned in the train locomotive and is provided for initiating braking action of the rail car. Head end unit 22 includes entry buttons or keys and associated control circuitry for receiving braking commands from a locomotive engineer and for transmitting brake signals to car control unit 24 by conventional electrical control cabling.

Car control unit 24 receives the brake signals from head end unit 22 and controls or activates brake cylinder 20 of the rail car in response to the brake signals. Separate car control units 24 are mounted in each rail car of the train.

As shown in FIG. 1, preferred truck hunting detection and abatement apparatus 10 includes acceleration sensor 26 and car control unit 24. Acceleration sensor 26 is mounted adjacent to truck 14 of the rail car and is coupled with car control unit 24 by conventional electronic cabling, or any other suitable means. Sensor 26 provides a means for measuring acceleration of truck 14 in a direction transverse to rails 16, 18. The measured acceleration of truck 14 is representative of the acceleration of the rail car in the direction transverse to the rail. The truck hunting condition exists when the measured acceleration exceeds a predetermined acceleration limit.

Car control unit 24 includes analog-to-digital (A-D) converter 28, microprocessor 30 and brake control valves 32. Car control unit 24 also includes other control electronics, pneumatic valves and air pressure sensors described in detail in the '974 patent incorporated by reference.

Microprocessor 30 is responsive to sensor 26 via A-D converter 28 for monitoring the measured acceleration of truck 14. Microprocessor 30 provides a means for comparing the measured acceleration of the rail car with the predetermined acceleration limit, and for application of the brakes of the rail car when the acceleration exceeds the predetermined limit to abate the truck hunting condition. Microprocessor 30 is also responsive to brake signals transmitted by head end unit 22 for application of the brakes to slow or stop the train.

In a preferred form, microprocessor 30 is a programmable microprocessor, but also may be any other conventional electronic control device operable for monitoring acceleration sensor 26 and for applying the rail car brakes. Microprocessor 30 may also be programmed to store the acceleration of the rail car in memory to maintain a history of the acceleration. This information can then be used by service personnel to make adjustments or repairs to truck 14 to reduce the tendency of truck 14 to enter the truck hunting condition.

In addition, microprocessor 30 may be programmed to generate a message for transmission to head end unit 22 when the time interval between successive brake application signals is less than a predetermined time interval limit. This condition is representative of excessive truck hunting. The message thus alerts the locomotive engineers of excessive truck hunting.

Brake control valves 32 are coupled with a source of pressurized air and an air reservoir tank. Valves 32 and their corresponding pneumatic supply are provided for directing air to brake cylinder 20 of the rail car. Valves 32 are controlled by microprocessor 30 for application of the brakes. For example, microprocessor 30 controls the position of valves 32, and thus controls the amount of air delivered to brake cylinder 20. The position of valves 32 is controlled in response to the brake signals transmitted by head end unit 22 and in response to the brake application signal generated by microprocessor 30 when the measured acceleration exceeds the predetermined acceleration limit.

Figure 2:
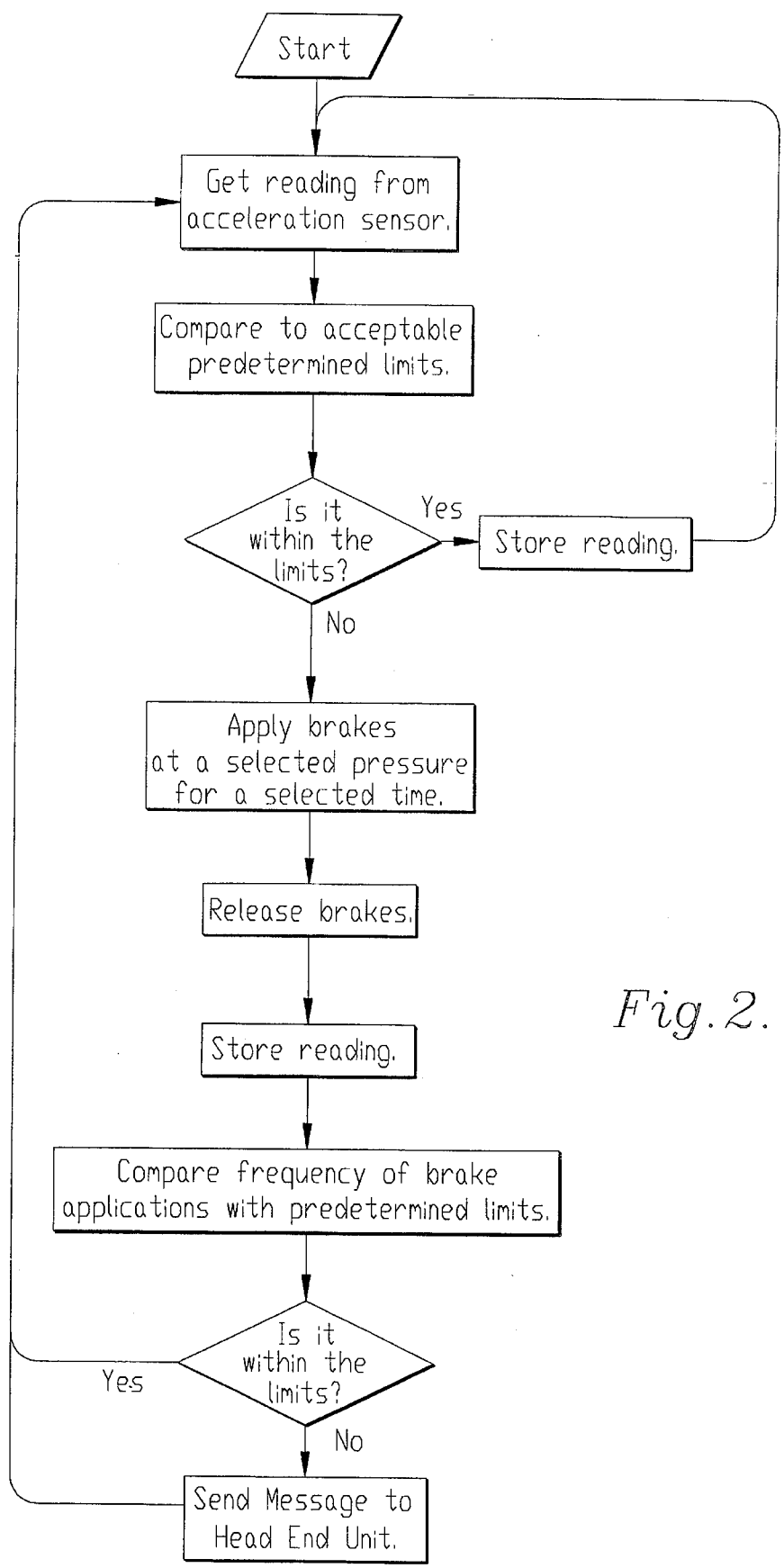

Turning to FIG. 2, in operation, sensor 26 of truck hunting detection and abatement apparatus 10 measures the acceleration of truck 14 in a direction transverse to rails 16, 18. The acceleration is compared with a predetermined acceleration limit by microprocessor 30. As those skilled in the art will appreciate, the acceleration limit is determined based on a historical reference database of the normal oscillations of the rail car. Microprocessor 30 may be programmed for different acceleration limits for use with different rail cars.

If the measured acceleration is less than the predetermined limit, the measured acceleration is stored in the memory of microprocessor 30, and a new measurement is taken by sensor 26. By continually taking acceleration measurements and comparing the measured acceleration with the predetermined limit, a history of the oscillation of the rail car between rails 16, 18 is documented.

If the measured acceleration exceeds the predetermined limit, microprocessor 30 causes valves 32 to direct a selected amount of air to brake cylinder 20 for a selected amount of time based upon the measured acceleration. As a result, microprocessor 30 is able to apply the brakes of the rail car at a selected pressure for the selected time to abate the truck hunting condition with maximum efficiency. Upon completion of the braking cycle, the brakes are released.

After the brakes have been released, information is stored in the memory of microprocessor representative of the frequency of braking applications. Microprocessor 30 then compares the time interval between successive braking applications with a predetermined time interval limit. If the time interval between successive braking applications is less than the time interval limit, a message is generated for transmission to head end unit 22. The message indicates to the locomotive engineers that the rail car is experiencing excessive truck hunting. The engineers are then able to notify the proper service personnel.

Truck hunting detection and abatement apparatus has been described with reference to the illustrated preferred embodiment. It is noted that changes may be made and equivalents employed without departing from the scope of the invention as set forth in claims.

What is claimed is:

1. In a rail car having a truck for traveling on a rail and having brakes for braking the car, a rail car brake control apparatus comprising:

a brake controller operable for selectively applying the brakes of the rail car; and sensor means coupled with said brake controller for measuring acceleration of the rail car in a direction transverse to the rail, said brake controller including control means responsive to said sensor means for determining whether said acceleration exceeds a predetermined acceleration limit, and for selectively applying the brakes if said acceleration exceeds said limit.

2. The brake control apparatus as set forth in claim 1, said acceleration being representative of oscillatory movement of the rail car in a direction transverse to the rail.

3. The brake control apparatus as set forth in claim 1, said control means including measuring means for measuring a time interval between consecutive applications of the brakes of the rail car, said time interval being representative of the frequency of application of the brakes.

4. The brake control apparatus as set forth in claim 3, the rail car configured to be driven by a locomotive having a head end unit, said control means further including means for comparing said time interval with a predetermined time interval limit, and for generating a message for transmission to the head end unit of the locomotive when said time interval is less than said time interval limit, the message being indicative of excessive truck hunting.

5. The brake control apparatus as set forth in claim 1, said control means including memory means for storing said acceleration of the rail car.

6. The brake control apparatus as set forth in claim 1, said sensor means including an acceleration sensor configured to be positioned adjacent to the rail car truck.

7. The brake control apparatus as set forth in claim 1, said control means including an electronic control device.

8. The brake control apparatus as set forth in claim 1, said control means including a microprocessor.

9. The brake control apparatus as set forth in claim 1, further including a communications link between said control means and the controller.

10. A car control apparatus for a rail car having a truck traveling on a rail, the rail car including brakes for braking the car, said car control apparatus comprising:

a control means for controlling the brakes of the rail car; and a truck hunting detection sensor for sensing acceleration of the rail car in a direction transverse to the rail, said control means including means responsive to said sensor means for comparing said acceleration of the rail car with a predetermined acceleration limit, and for applying the rail car brakes when the measured acceleration is greater than the predetermined limit.

11. The car control apparatus as set forth in claim 10, said control means including measuring means for measuring a time interval between consecutive applications of the rail car brakes by said control means, said time interval being representative of the frequency of application of the rail car brakes.

12. The car control apparatus as set forth in claim 11, the rail car configured to be driven by a locomotive having a head end unit, said control means further including means for comparing said time interval with a predetermined time interval limit, and for generating a message for transmission to the head end unit of the locomotive when said time interval is less than said time interval limit, the message being indicative of excessive truck hunting.

13. The car control apparatus as set forth in claim 10, said control means including memory means for storing said acceleration of the rail car.

14. A truck hunting detection and abatement method for a rail car having a truck traveling on a rail, the rail car including brakes for braking the car, said method comprising the steps of:

(a) measuring acceleration of the truck in a direction transverse to the rail using a sensor;

(b) in a brake controller responsive to said sensor and including control means for controlling the brakes of the rail car, comparing the acceleration measured by said sensor with a predetermined acceleration limit; and (c) applying the brakes of the rail car using said control means when the acceleration exceeds the predetermined acceleration limit.

15. The method as set forth in claim 14, further including the step of determining a duration of time for applying the brakes correlated with the acceleration of the truck before the step of applying the brakes.

16. The method as set forth in claim 14, further including the step of determining a time interval between consecutive applications of the brakes of the car, the time interval being representative of the frequency of brake applications.

17. The method as set forth in claim 16, the rail car being moved along the rail by a train locomotive having a head end unit, said method further including the steps of comparing the time interval with a predetermined time interval limit, and generating a message for transmission to the head end unit when the time interval is less than the time interval limit.

18. The method as set forth in claim 14, further including the step of recording the acceleration of the truck.

* * * * *